(12) United States Patent
Perlman (10) Patent No.: US 7,016,499 B2
(45) Date of Patent: Mar. 21, 2006

(54) SECURE EPHEMERAL DECRYPTABILITY

(75) Inventor: Radia J. Perlman, Carlisle, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 721 days.

(21) Appl. No.: 09/880,470

(22) Filed: Jun. 13, 2001

(65) Prior Publication Data

US 2002/0191797 A1    Dec. 19, 2002

(51) Int. Cl.
*H04L 9/00*    (2006.01)

(52) U.S. Cl. ..................................... 380/281

(58) Field of Classification Search ........ 380/278–279, 380/284–285, 281, 273; 713/171
See application file for complete search history.

(56) References Cited

U.S. PATENT DOCUMENTS

| | | | |
|---|---|---|---|
| 5,737,419 A | 4/1998 | Ganesan ..................... | 380/21 |
| 5,812,669 A * | 9/1998 | Jenkins et al. .............. | 713/161 |
| 6,009,173 A | 12/1999 | Sumner ....................... | 380/21 |
| 6,044,462 A | 3/2000 | Zubeldia et al. ........... | 713/158 |
| 6,185,685 B1 | 2/2001 | Morgan et al. ............. | 713/183 |
| 6,240,187 B1 | 5/2001 | Lewis ......................... | 380/282 |
| 6,308,277 B1 | 10/2001 | Vaeth et al. ................ | 713/201 |
| 6,367,019 B1 | 4/2002 | Ansell et al. ............... | 713/201 |
| 2002/0136410 A1 * | 9/2002 | Hanna ........................ | 380/277 |

OTHER PUBLICATIONS

Applied Cryptography,, Protocols, Algorithms, and Source Code in C, Second Edition, Bruce Schneier, Oct. 1995.

* cited by examiner

*Primary Examiner*—Gregory Morse
*Assistant Examiner*—Peter Poltorak
(74) *Attorney, Agent, or Firm*—Kudirka & Jobse, LLP (57) ABSTRACT

A method and apparatus for securely communicating ephemeral information from a first node to a second node. In a first embodiment, the first node encodes and transmits an ephemeral message encrypted at least in part with an ephemeral key, from the first node to the second node. Only the second node has available to it the information that is needed to achieve decryption by an ephemeral key server of a decryption key that is needed to decrypt certain encrypted payload information contained within the message communicated from the first node to the second node. In a second embodiment the first node transmits to the second node an ephemeral message that is encrypted at least in part with an ephemeral key. The ephemeral message includes enough information to permit the second node to communicate at least a portion of the message to an ephemeral key server and for the ephemeral key server to verify that the second node is an authorized decryption agent for the message. After verifying that the second node is an authorized decryption agent for the message, the ephemeral key server returns to the second node an encrypted decryption key that is needed to decrypt the encrypted message. The ephemeral message may comprise an encrypted decryption key that may be used after decryption of the decryption key to decrypt other encrypted information communicated to the second node.

30 Claims, 7 Drawing Sheets

| | 14 | 16 | 18 | 20 |
|---|---|---|---|---|
| EKP1 | Pub-Key$_1$ | Priv-Key$_1$ | Expiration Time$_1$ | Key Id$_1$ |
| EKP2 | Pub-Key$_2$ | Priv-Key$_2$ | Expiration Time$_2$ | Key Id$_2$ |
| EKP3 | Pub-Key$_3$ | Priv-Key$_3$ | Expiration Time$_3$ | Key Id$_3$ |
| EKP4 | Pub-Key$_4$ | Priv-Key$_4$ | Expiration Time$_4$ | Key Id$_4$ |
| EKP5 | Pub-Key$_5$ | Priv-Key$_5$ | Expiration Time$_5$ | Key Id$_5$ |
| ⋮ | | | | |
| EKPN | Pub-Key$_n$ | Priv-Key$_n$ | Expiration Time$_n$ | Key Id$_n$ |

SECURE EPHEMERAL DECRYPTABILITY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to secure or private communications, and more specifically to a system and method for providing ephemeral decryptability of documents, files, and/or messages.

In recent years, individuals and businesses have increasingly employed computer and telecommunications networks, such as the World Wide Web (WWW), to exchange messages. These networks typically include a number of intermediate systems between the source of a message and its destination, at which the message may be temporarily written to a memory and/or data storage device. Such intermediate systems, as well as the communications lines within the network itself, are often considered to be susceptible to actions of a malicious third party, which may result in messages being intercepted as they are carried through the network. For this reason, various types of data encryption have been used to secure communications through such networks. Encryption algorithms are also sometimes used to support integrity checking and authentication of received messages. Integrity checking allows the message recipient to determine whether the message has been altered since it was generated, while authentication permits the recipient to verify the source of the message.

Specific encryption algorithms are usually thought of as being either "symmetric key" or "public key" systems. In symmetric key encryption, also sometimes referred to as "secret key" encryption, the two communicating parties use a shared, secret key to both encrypt and decrypt messages they exchange. The Data Encryption Standard (DES), published in 1977 by the National Bureau of Standards, and the International Data Encryption Algorithm (IDEA), developed by Xuejia Lai and James L. Massey, are examples of well known symmetric key encryption techniques. Public key encryption systems, in contrast to symmetric key systems, provide each party with two keys: a private key that is not revealed to anyone, and a public key made available to everyone. When the public key is used to encrypt a message, the resulting encoded message can only be decoded using the corresponding private key. Public key encryption systems also support the use of "digital signatures", which are used to authenticate the sender of a message. A digital signature is an encrypted digest associated with a particular message, which can be analyzed by a holder of a public key to verify that the message was generated by someone knowing the corresponding private key.

While encryption protects the encrypted data from being understood by someone not in possession of the decryption key, the longer such encrypted information is stored, the greater potential there may be for such a key to fall into the wrong hands. For example, key escrows are often maintained which keep records of keys. Such records may be stored for convenience in order to recover encrypted data when a key has been lost, for law enforcement purposes, to permit the police to eavesdrop on conversations regarding criminal activities, or for business management to monitor the contents of employee communications. However, as a consequence of such long-term storage, the keys may be discovered over time.

In existing systems, there are various events that may result in an encrypted message remaining stored beyond its usefulness to a receiving party. First, there is no guarantee that a receiver of an encrypted message will promptly delete it after it has been read. Additionally, electronic mail and other types of messages may be automatically "backed-up" to secondary storage, either at the destination system, or even within intermediate systems through which they traverse. The time period such back-up copies are stored is sometimes indeterminate, and outside control of the message originator. Thus, it is apparent that even under ordinary circumstances, an encrypted message may remain in existence well beyond its usefulness, and that such longevity may result in the privacy of the message being compromised.

Existing systems for secure communications, such as the Secure Sockets Layer (SSL) protocol, provide for authenticated, private, real-time communications. In the SSL protocol, a server system generates a short-term public/private key pair that is certified as authentic using a long-term private key belonging to the server. The client uses the short-term public key to encrypt a symmetric key for use during the session. The server periodically changes its short-term private key, discarding any previous versions. This renders any records of previous sessions established using the former short-term public key undecryptable. Such a system is sometimes referred to as providing "perfect forward secrecy". These existing systems, however, provide no mechanism for setting or determining a finite "lifetime", in terms of decryptability, for stored encrypted data or messages independent of a real-time communications session.

Accordingly it would be desirable to have a system for specifying a finite period after which stored encrypted data, such as electronic mail messages, cannot be decrypted. After such a "decryption lifetime" period expires, the encrypted data should become effectively unrecoverable. The system should provide the ability to specify such a decryptability lifetime on a per message, data unit, or file basis, independent of any particular real-time communications session. Additionally, the system should not transmit information in a manner that would permit an eavesdropper or malicious party to decrypt the information by obtaining a long term decryption key subsequent to expiration of an ephemeral key pair used in the respective encryption process.

BRIEF SUMMARY OF THE INVENTION

A system and method for providing ephemeral decryptability is disclosed. The presently disclosed system and method enables a user to encrypt a message in a way that ensures that the message cannot be decrypted after a finite period. The encrypted message that will become undecryptable after the finite period of time is referred to herein as an ephemeral message.

One or more ephemeral encryption keys are provided by an ephemerizer service or node to a party wishing to encrypt a message to be passed to a destination party. The node that provides the ephemeral service is referred to as an ephemerizer The ephemeral key or keys are each associated with an expiration time.

A first node communicates with a second node using the ephemerizer node as an "ephemerizer service". The ephemerizer publishes a selection of ephemeral public/private key pairs, or generates ephemeral symmetric keys upon request. Each ephemeral key is associated with an expiration time. A party wishing to encrypt a message acquires one of the ephemerizer's ephemeral encryption keys with an appropriate expiration time. Alternatively, where none of the associated expiration times offered by the ephemerizer are appropriate for the message to be transmitted, the party wishing to encrypt that message may request an ephemeral key expiration time or range of expiration times, in which case the ephemerizer generates an ephemeral key having an appropriate expiration time and provides it to the requester.

Associated with each ephemeral key is a key identifier (Key Id). The Key ID is used by a client of the ephemeral service to inform the ephemerizer which key to use to decryption. If no Key ID is employed or specified, the ephemerizer may successively try to decrypt an ephemeral message using the keys available until the proper key is found. If there are only a relatively small number of keys, this method is feasible, if not optimal.

In a first illustrative embodiment in which a first node desires to transmit a message to a second node using the ephemerizer service, the second node proves knowledge of its private key by unwrapping certain information that is then forwarded to the ephemerizer. The ephemerizer then cooperates in the decryption process.

More specifically, the first node generates a first secret key and encrypts an information message intended for the second node with the first secret key. The first node then encrypts the first secret key with a public key associated with the second node and further encrypts the resulting string with an ephemeral public key having a desired expiration time to form an ephemeral key string. The first node further encrypts the ephemeral key string and the ephemeral public key with the public key associated with the second node to form an encoded key string and transmits to the second node the encrypted information message, the encoded key string and a URL that identifies the ephemerizer to be used in the decryption process.

The second node utilizes its private key to decrypt the encoded key string and additionally generates a second secret key for use in communicating with the applicable ephemerizer. The second node transmits to the ephemerizer at the ephemerizer URL the second secret key encrypted with the ephemeral public key and additionally, the ephemeral key string encrypted with the second secret key. The ephemerizer decrypts the second secret key using the applicable ephemeral private key and decrypts the ephemeral key string using the second secret key to obtain the ephemeral key string. The ephemerizer then decrypts the ephemeral key string using the ephemeral private key to obtain the first secret key that is encrypted with the second node public key. The ephemerizer then encrypts the encrypted first secret key with the second secret key and transmits the same to the second node.

The second node unwraps the first secret key received from the ephemerizer by first decrypting the string with the second secret key and then decrypting the resultant string with the second node private key to obtain the first secret key. The first secret key is used to decrypt the information message. The information message and the first secret key are deleted by the second node to prevent access to the message by an attacker who might discover the second node private key subsequent to the expiration of the respective ephemeral key pair.

In a second illustrative embodiment, the second node obtains the cooperation of the ephemerizer in decrypting the data needed to decrypt the message by proving to the ephemerizer that it possesses the private key associated with a public key that is securely associated with the encrypted data.

More specifically, in the second embodiment, the first node generates a first secret key and encrypts an information message intended for the second node with the first secret key. The first node then encrypts the first secret key with a public key associated with the second node to form an encrypted first secret key and further encrypts the encrypted first secret key and the second node public key with an ephemeral public key to form an ephemeral key string having a desired expiration time. The first node then transmits to the second node the encrypted information message, the ephemeral key string, the relevant ephemeral public key, the Key Id and information that identifies and is useful for location of the ephemerizer that is to be used in the decryption process.

The second node generates a second secret key for use in communicating with the ephemerizer. The second node then encrypts the second secret key with the ephemerizer public key to form an encrypted second secret key and encrypts the ephemeral key string with the second secret key to form an encoded key string. The second node next transmits to the ephemerizer a message that includes at least the encrypted second secret key and the encoded key string. The message that is transmitted by the second node is signed using the private key of the second node.

The ephemerizer decrypts the second secret key using the applicable ephemeral public key and then decrypts the encoded key string using the second secret key to obtain the ephemeral key string. The ephemerizer next decrypts the ephemeral key string using the applicable ephemeral private key to obtain the first secret key encrypted with the second node public key and to obtain the second node public key. The ephemerizer then verifies the signature of the second node using the second node public key obtained by decrypting the ephemeral key string. The verification of the second node signature using the second node public key assures that the second node is an authorized decryption agent for the encrypted message. Following verification of the second node signature, the ephemerizer encrypts the encrypted first secret key with the second secret key and transmits the result to the second node.

The second node unwraps the encrypted first secret key by first decrypting the string received from the ephemerizer with the second secret key and then decrypting the result with the second node private key. After obtaining the first secret key in the foregoing manner, the second node uses the first secret key to decrypt the encrypted message received from the first node. The information message and the first secret key are deleted by the second node to prevent access to the message by an eavesdropper who might otherwise discover the second node private key or the first secret key subsequent to the expiration of the respective ephemeral key pair.

Other aspects, features and advantages of the disclosed methods and systems will be apparent to those skilled in the art from the Detailed Description that follows.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION

Consistent with the present invention, a system and method for providing ephemeral decryptability is disclosed which enables a user to ensure that encrypted information messages will become undecryptable after a certain point in time. In the presently described system and method, anyone that obtains access to a long term private key of an intended message recipient is unable to decrypt the information message subsequent to the expiration of the applicable ephemeral key pair.

Figure 1:
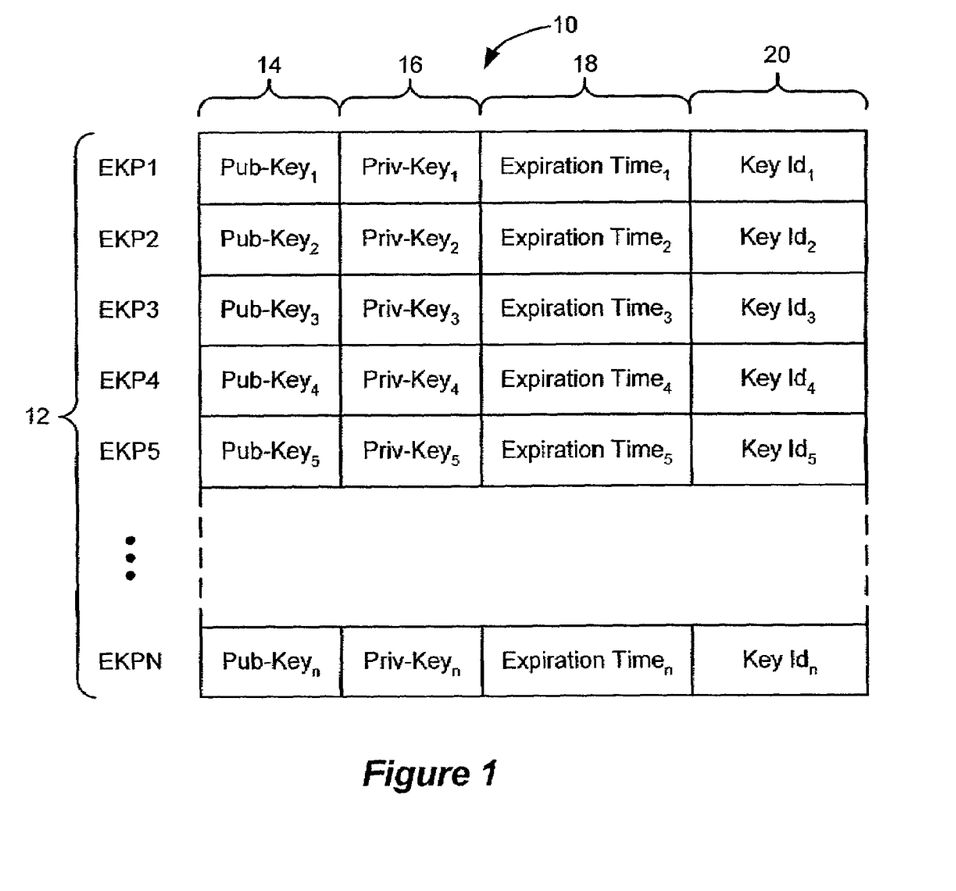
FIG. 1 shows an ephemeral key pair list.
Figure 2:
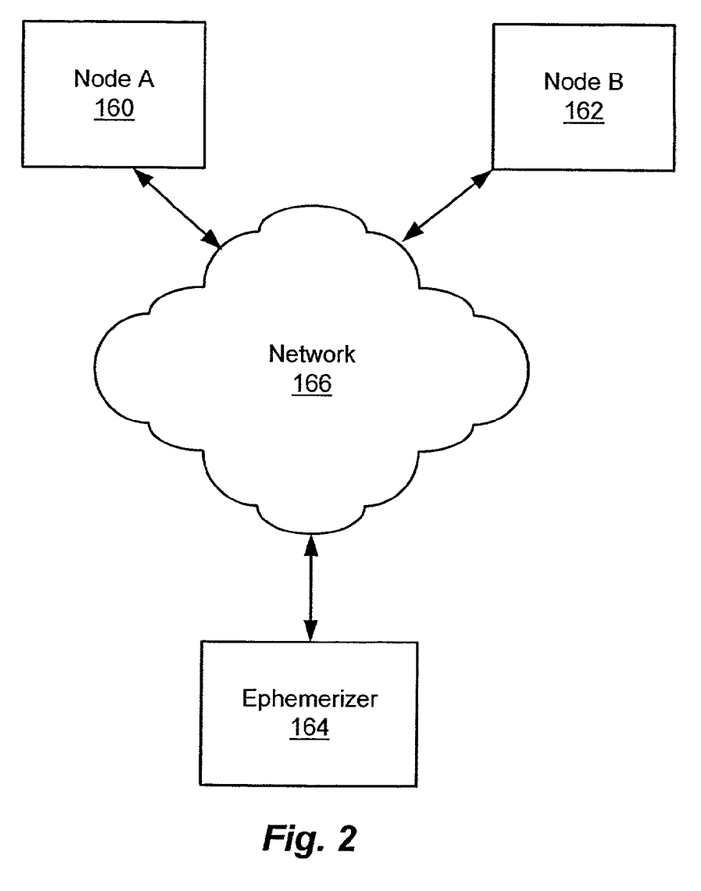
FIG. 2 is a block diagram of a system operative in a manner consistent with the present invention.

As shown in FIG. 1, an ephemeral key pair list 10 includes a number of ephemeral key pairs 12. Each ephemeral key pair includes a public key 14, a private key 16. An expiration time 18 an a Key ID 20 are associated with each ephemeral key pair. The public key 14 of an ephemeral key pair and the associated expiration time 18 and Key Id 20 may be read by parties wishing to use an ephemeral key pair 12. The private key 16 of each ephemeral key is accessible only to the ephemerizer 164 (FIG. 2). As in conventional public key encryption techniques, data encrypted using one of the public keys 14 can only be decrypted using the private key 16 from the same ephemeral key pair. Each of the ephemeral key pairs 12 represents a promise by the publisher of the ephemeral key pair list 12 that the ephemeral key pair will be irretrievably destroyed at the associated expiration time.

Referring to FIG. 2, the system includes a first node identified as Node A 160, a second node that is identified as Node B 162, and an ephemerizer 164. Node A 160, Node B 162 and the ephemerizer 164 are communicably coupled via a network 166 to permit communication among the nodes and the ephemerizer. The network 166 may comprise a local area network, a wide area network, a global communications network such as the Internet, a wireless or any other network suitable for communicably coupling the nodes 160, 162 and the ephemerizer 164. Moreover, the network 166 may include various types of networks, such as those identified above, as sub-networks within a larger network.

Figure 3:
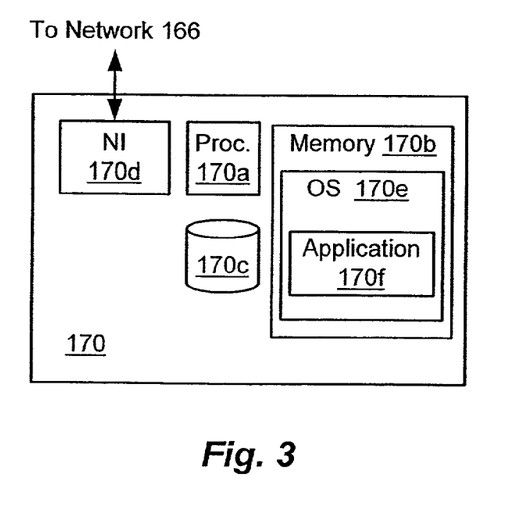
FIG. 3 depicts a block diagram of an exemplary computer system operative to perform the functions of the respective nodes and the ephemerizer depicted in FIG. 2.

Nodes A 160, Node B 162 and the ephemerizer 164 each typically comprise a computer system 170, as generally depicted in FIG. 3. The computer system 170 may be in the form of a personal computer or workstation, a personal digital assistant (PDA), an intelligent networked appliance, a controller or any other device capable of performing the functions attributable to the respective devices as described herein.

As depicted in FIG. 3, the computer system 170 typically includes a processor 170a that is operative to execute programmed instructions out of an instruction memory 170b. The instructions executed in performing the functions herein described may comprise instructions stored within program code considered part of an operating system 170e, instructions stored within program code considered part of an application 170f, or instructions stored within program code allocated between the operating system 170e and the application 170f. The memory 170b may comprise Random Access Memory (RAM), or a combination of RAM and Read Only Memory (ROM). The Nodes 160, 162 and the ephemerizer 164 each typically include a network interface 170d for coupling the respective device to the network 166. The devices within the system may optionally include a secondary storage device 170c such as a disk drive, a tape drive or any other suitable secondary storage device.

Figure 4A:
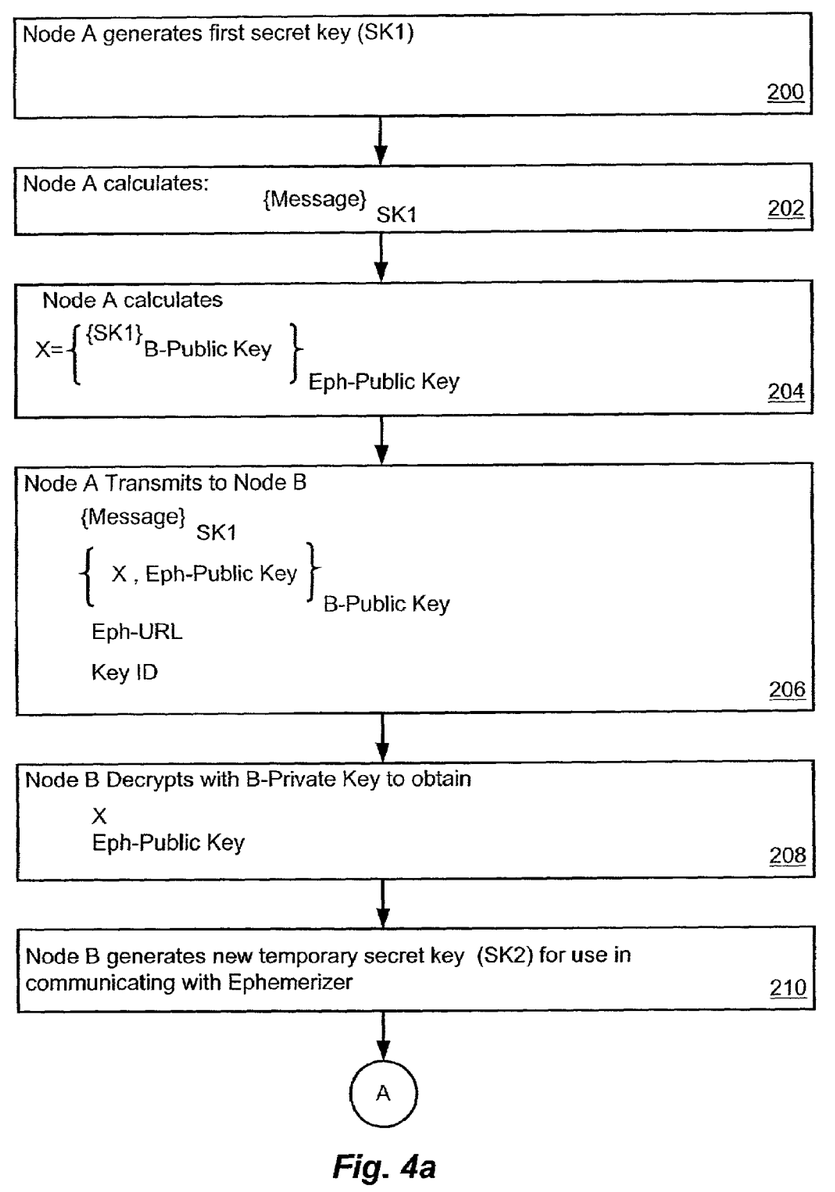
FIGS. 4a, 4b and 4c are a flow diagram that depict an exemplary method of operation of the system depicted in FIG. 2.

The operation of the system is illustrated by reference to FIGS. 2 and 4a–4c. It is assumed for purposes of illustration that Node A 160 desires to send an ephemeral message to Node B 162, that is, a message that will become undecipherable after some time. In this circumstance, Node A 160 (FIG. 2) generates a first secret encryption key (SK1) as depicted in step 200 (FIG. 4a). The first secret encryption key has an associated decryption key. The first secret encryption key generated by Node A 160 is a temporary key and may be either a symmetric key or an asymmetric key. It is assumed for simplicity of illustration that the first secret encryption key comprises a symmetric key. As indicated in step 202, Node A 160 next encrypts the message with the key SK1. Next, Node A encrypts the first secret key SK1 with the public key (B-Public Key) of Node B 162 and encrypts the encrypted secret key SK1 with the ephemeral public key (EPH-Public Key) to form X as illustrated in Step 204. After encryption of the first secret key SK1 with Node B's public key and the Ephemeral public key, as indicated in step 206, Node A 160 transmits to Node B 162 the information message encrypted with the first secret key (SK1), X and the ephemeral public key collectively encrypted with Node B's public key, the ephemeral public key and the address (URL) of the ephemerizer 164. Node B then decrypts {X,Eph-Public Key}B-Public Key with Node B's private key to obtain X and the ephemeral public key as illustrated in step 208. Node B 162 then generates or obtains a second secret key SK2 for use in communicating with the ephemerizer 164 as depicted in step 210. The second secret key SK2 comprises a temporary key.

Node B 162 next transmits to the ephemerizer 164 the second secret key SK2 encrypted with the ephemeral public key, X encrypted with the second secret key SK2 and Node B's public key as illustrated in step 212.

Figure 4B:
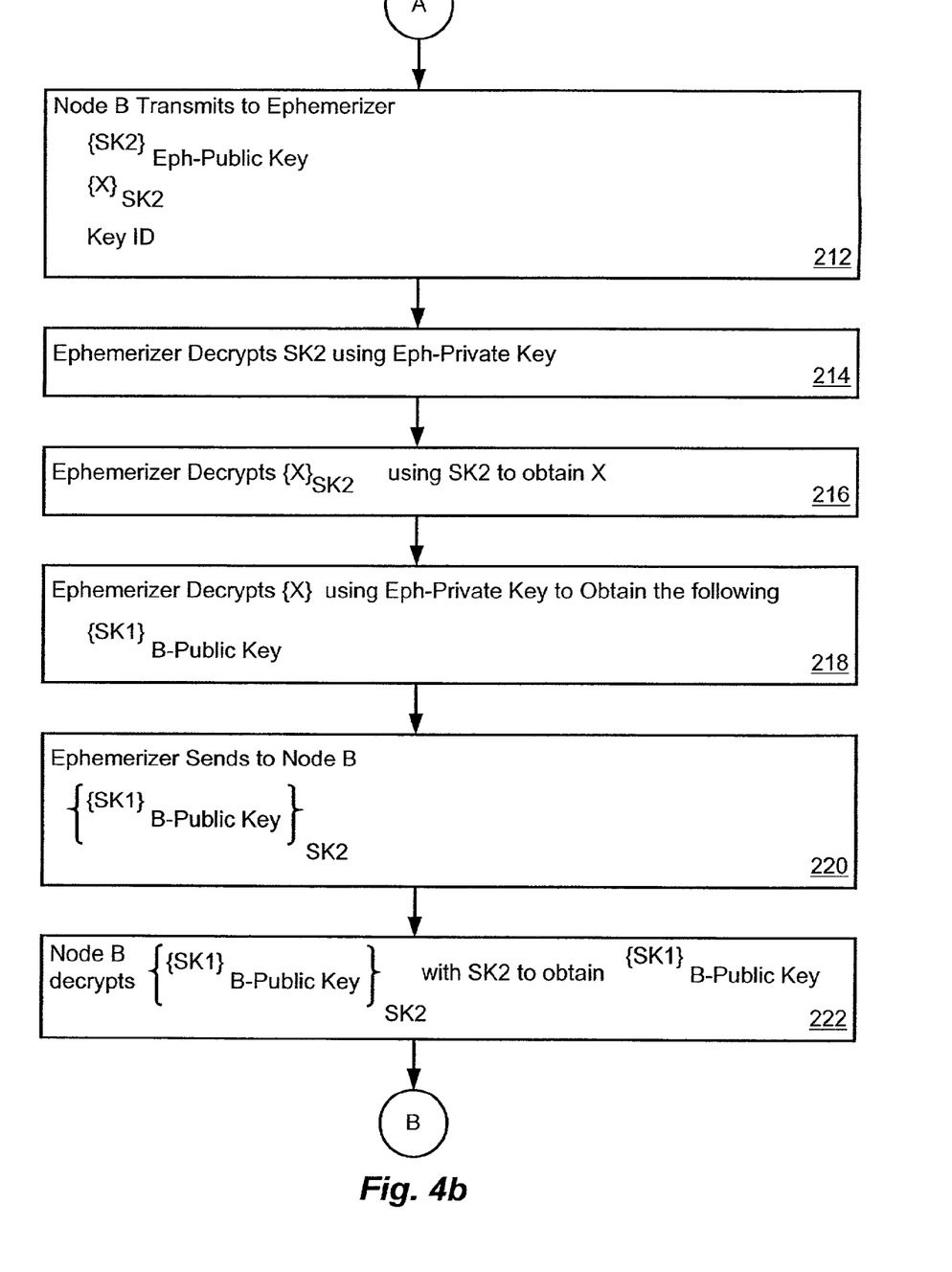

Following receipt of the above-identified transmission from Node B 162, the ephemerizer 164 decrypts the second secret key (SK2) using the ephemeral private key assuming that the ephemeral key has not expired as depicted in step 214. The ephemerizer 164 next decrypts {X}SK2 using the second secret key SK2 to obtain X as depicted in step 216. The ephemerizer 164 then decrypts X using the ephemeral private key (assuming that the respective ephemeral key has not expired) to obtain {SK1}B-Public Key as shown in step 218.

As illustrated in step 220, the ephemerizer 164 then encrypts {SK1}B-Public Key with the second secret key (SK2) and sends the result to Node B 162 as depicted in step 220. As shown in step 222, Node B 162 then decrypts {{SK1}B-Public Key}SK2 using the second secret key (SK2) to obtain {SK1}B-Public Key. Thereafter, as illustrated in step 224, Node B 162 decrypts {SK1}B-Public Key using Node B's private key to obtain the first secret key.

Figure 4C:
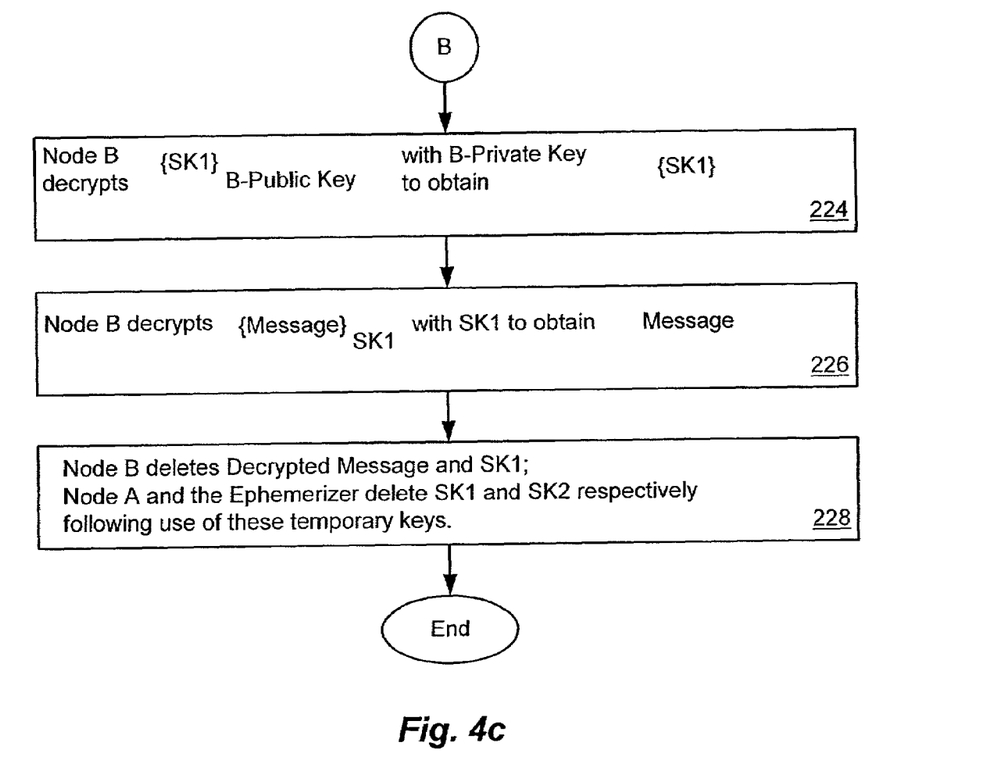

Node B 162 then uses the first secret key to decrypt the message that was encrypted using the first secret key to obtain the unencrypted message as illustrated in step 226. Finally, Node B 162 deletes the message, SK1 and SK2 to prevent another party from obtaining access to the first secret key that is needed to decrypt the message, as illustrated in step 228. Node A 160 and the ephemerizer 164 also destroy SK1 and SK2 respectively, following completion of their respective tasks employing such temporary keys.

Via the above-described technique, once the first secret key is inaccessible there is no longer an ability to decrypt the encrypted information message. Moreover, once the ephemeral key expires, Node B 162 loses the ability to have to have SK1 decrypted by the ephemerizer 164 and decryption of the encrypted information message is thwarted.

In the illustrated method the first secret key (SK1) is encrypted with Node B's Public Key by Node A 160 as depicted in step 204. Traditionally, when encrypting a message that is larger than a single RSA block with a public key, it is more efficient to encrypt the message with a secret key and to then encrypt the secret key with the respective public key. Thus, if the encryption of SK1 with Node B's Public Key is not smaller than the ephemeral public key, it will take more than a single public key encryption operation to encrypt SK1. In this event, it is more efficient, rather than directly encrypting SK1 with Node B's public key, to encrypt SK1 with a randomly chosen secret key (SK3) and to encrypt the secret key SK3 with Node B's Public Key. In this event X={{SK1}SK3}Eph-Public Key, {SK3}B-Public Key. Given this optimization, Node A 160 would transmit to Node B 162 the following message:

{Message}SK1, {X, Eph-Public Key}SK3, {SK3}B-Public Key, Eph-URL

Figure 5A:
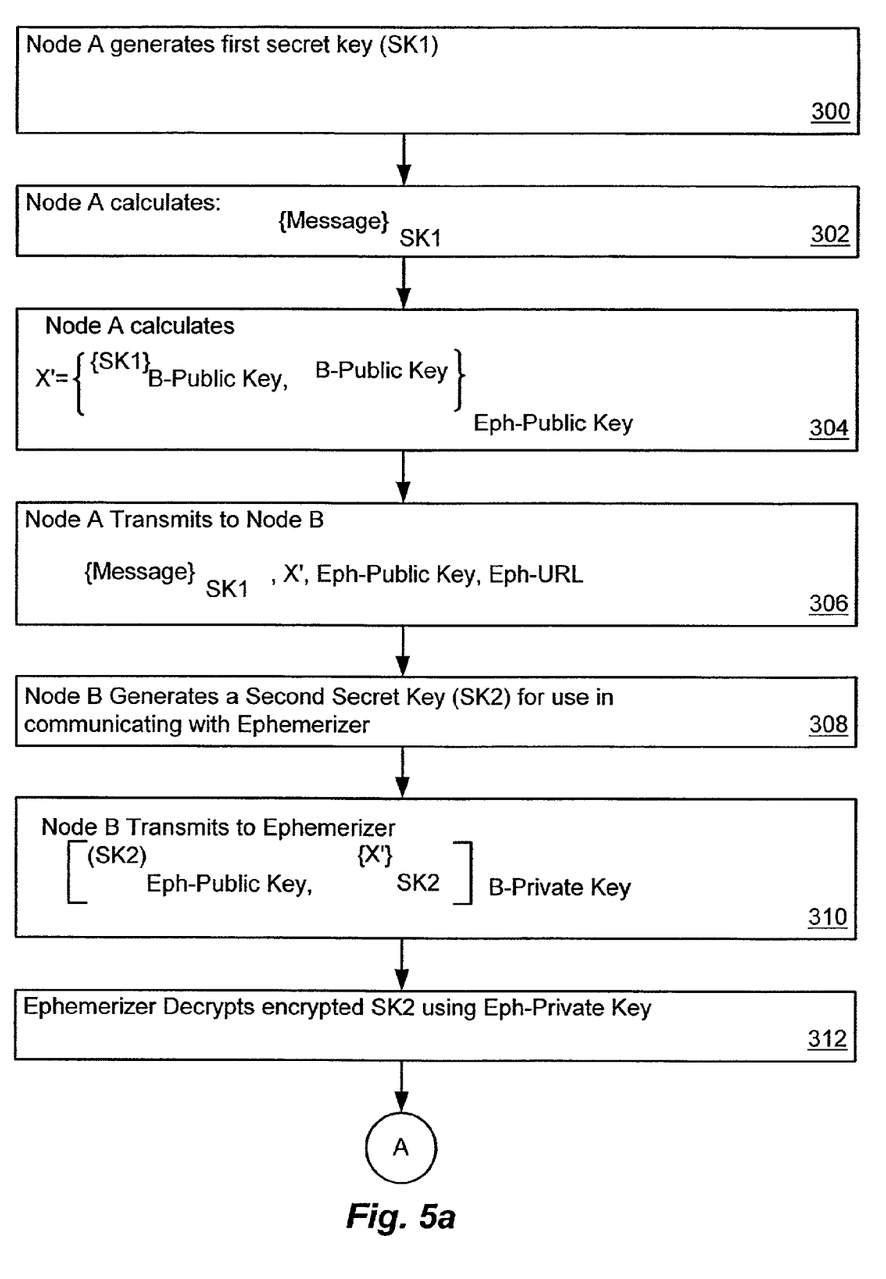
FIGS. 5a and 5b are a flow diagram that depict another exemplary method of operation of the system depicted in FIG. 2.
Figure 5B:
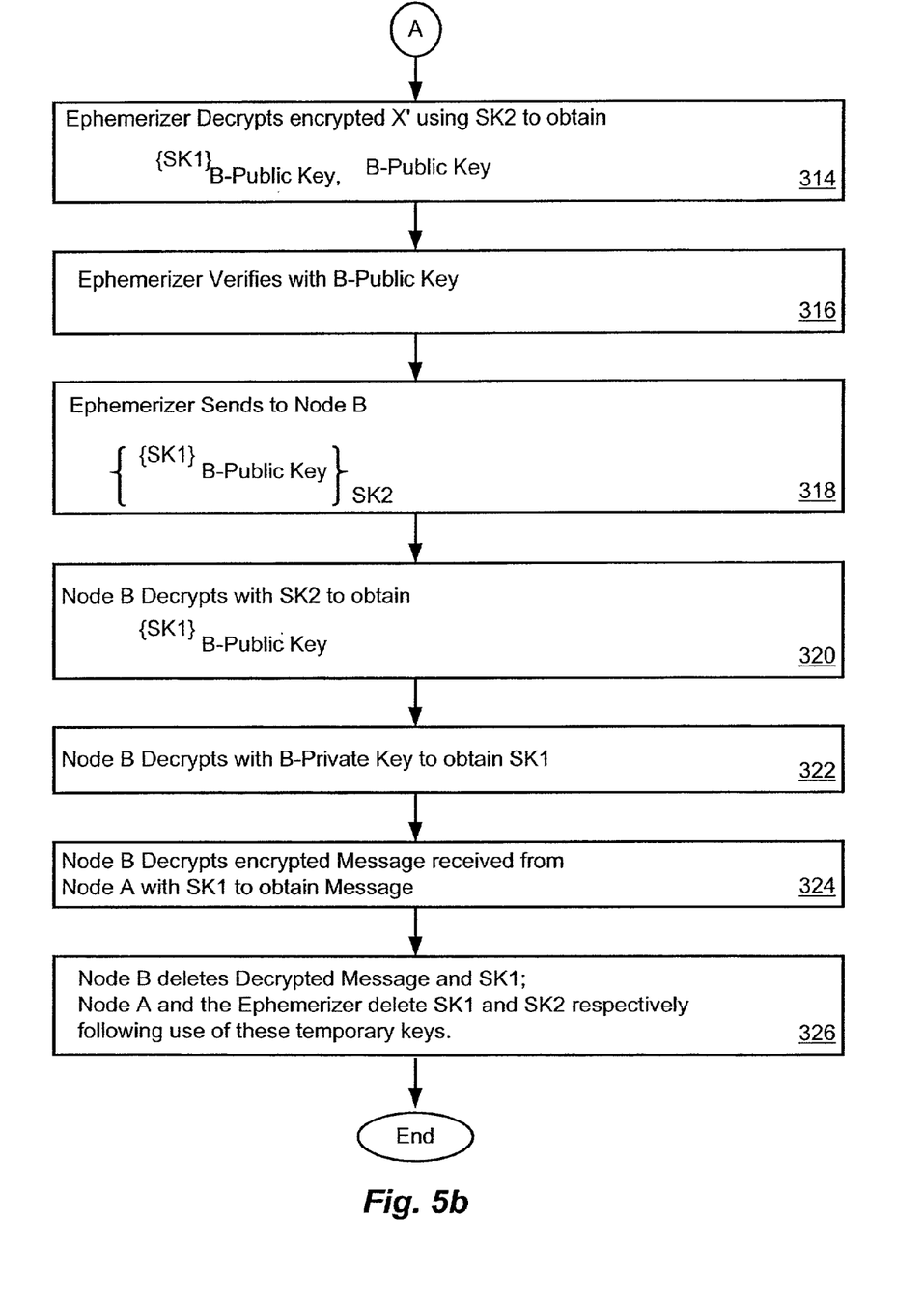

As a further optimization, Node A 160 may encrypt a digest of the ephemeral public key (MD(Eph-Public Key)) rather than the ephemeral public key itself and transmit the ephemeral public key as plain text. This process reduces the amount of information that needs to be encrypted with Node B's public key and reduces computational resources and time needed to perform the specified encryption. In such event the message transmitted by Node A 160 to Node B 162 in step 206 would be as follows:

{Message}SK1, {X, MD(Eph-Public Key)}SK3, {SK3}B-Public Key, Eph-Public Key, Eph-URL An alternative embodiment for communication of an ephemeral message from Node B 162 to Node A 160 via a network 166 is illustrated in the flow chart of FIGS. 5a and 5b. In this embodiment, Node A securely conveys to the ephemerizer 164 a verification key associated with the intended recipient of the message (e.g. Node B). The verification key is used by the ephemerizer 164 to verify that the intended recipient is a proper recipient of the message. More specifically, referring to FIG. 5a, as depicted in step 300, Node A generates a first secret key SK1. The first secret key SK1 is preferably a temporary key. As depicted in step 302, Node A 160 encrypts a message intended for communication to Node B using the first secret key SK1. Subsequently, Node A calculates a value X' that includes the first secret key (SK1) encrypted with the Node B public key and also includes the Node B public key all encrypted with the ephemeral public key for the ephemerizer 164, as illustrated in step 304. The Node B Public Key is included to facilitate subsequent verification, by the ephemerizer 164, of a message received from Node B and signed with the Node B private key in the circumstance in which the ephemerizer 164 is not in possession of that key.

As shown in step 306, Node A then sends to Node B the message encrypted with the first secret key, X', the ephemeral public key, the URL of the ephemerizer, and the applicable Key ID. The URL of the ephemerizer is included so that Node B 162 can identify the ephemerizer 164 to be used during the decryption (unwrapping) process. Node B then generates or obtains a second secret key SK2 for use in communicating with the ephemerizer 164 as illustrated in step 308. The second private key SK2 is also a temporary secret key and in the illustrative embodiment is a symmetric key. Node B then sends to the ephemerizer 164 the second secret key SK2 encrypted with the ephemeral public key and the string X' encrypted with the second secret key SK2. The message transmitted to the ephemerizer 164 by Node B 162 is signed by Node B 162 using Node B's private key, all as depicted in step 310. The ephemerizer 164 decrypts the encrypted secret key using the ephemeral private key to obtain the second secret key SK2 as depicted in step 312. The ephemerizer 164 then decrypts the encrypted string X' using the second secret key SK2 to obtain the first secret key encrypted with the Node B public key along with the Node B public key as illustrated in step 314. The ephemerizer 164 verifies that the message is in fact from Node B 162 using Node B's public key as shown in step 316; i.e. that the request to unwrap the message is from an authorized decryption agent for the respective message.

The ephemerizer 164, following verification of the signature, transmits to Node B 162 the first secret key encrypted with the Node B public key and further encrypted with the second secret key SK2 as illustrated in step 318. Node B 162 then decrypts the encrypted string received from the ephemerizer 164 using the temporary second secret key SK2 to obtain the first secret key SK1 encrypted with the Node B public key, as shown in step 320. As illustrated in step 322, Node B 162 then decrypts the encrypted first secret key using the Node B private key to obtain the first secret key SK1. Node B 162 is then able to decrypt the encrypted message received from Node A 160 using the first secret key to obtain the message in unencrypted form as depicted in step 324.

Subsequently, as depicted in step 326, Node B 162 deletes the decrypted message and the first and second secret keys to prevent the message from being retrieved after expiration of the relevant ephemeral key. Additionally, the Node A 160 and the ephemerizer 164 destroy secret keys SK1 and SK2, respectively, when they have no further need for use of the respective keys. In the case of Node A, it may destroy SK1 following transmission of the ephemeral message to Node B. In the case of the ephemerizer 164, it may destroy SK2 following transmittal of the partially decrypted encryption key to Node B 162 (i.e. following step 318).

Thus, in accordance with the alternative illustrated technique, the ephemerizer 164 will not cooperate in the decryption process unless the entity requesting decryption (in the illustrative embodiment Node B 162) proves it has the corresponding private key. More specifically, in the illustrative embodiment, the ephemerizer 164 returns the value it has decrypted using its ephemeral private key. The value being returned is encrypted with the second secret key SK2 chosen by Node B 162 for communication with the ephemerizer 164. In the foregoing manner, no eavesdropper or impersonator sees the first secret key encrypted with a long-term key alone absent additional encryption with the second temporary secret key SK2. Upon deletion of the temporary keys SK1 and SK2 and following the expiration of the ephemeral period, the message become undecipherable and highly secure ephemeral communication is assured.

It should be understood that the optimization techniques described with respect to FIGS. 4a–4C may also be employed in connection with the alternative embodiment depicted in FIGS. 5a–5b.

If a large string of information is to be encrypted, it is more efficient to encrypt the string with a secret key and to then encrypt the secret key with the appropriate public key of a public/private key pair than to encrypt the string directly with the public key. It is recognized that, although in the disclosed embodiments, the data is encrypted with a secret key that is, in turn, encrypted with the public key of the ephemerizer, the data could have been encrypted with the ephemeral public key directly. This approach is feasible if the length of the data string to be encrypted is relatively short or if processing latency does not pose a problem. Thus, it is recognized that the string may comprise information desired to be communicated to an intended recipient or alternatively a secret key used to encrypt such information.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

A destruction capability may be provided in a hardware device which stores at least the ephemeral decryption keys and which only allows them to be read after receiving proof of a current time prior to the expiration time, or which erases the memory in which the ephemeral decryption keys are stored at their associated expiration times or renders such decryption keys inaccessible such that they cannot be recovered, for example by powering down a volatile memory in which the ephemeral keys are stored or otherwise rendering the applicable ephemeral decryption key inaccessible.

While the invention is described through the above exemplary embodiments, it will be understood by those of ordinary skill in the art that modification to and variation of the illustrated embodiments may be made without departing from the inventive concepts herein disclosed. Specifically, while the illustrative embodiments are disclosed with reference to messages passed between users of a computer network, the invention may be employed in any context in which messages are passed between communicating entities. Moreover, while the embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for performing secure ephemeral communication comprising:
   receiving, at a first node, a triply wrapped value, said value being encrypted with a first encryption key, having an associated first decryption key, to form a singly wrapped value, said singly wrapped value being encrypted with a second encryption key to form a doubly wrapped value and said doubly wrapped value being encrypted with a third encryption key to form said triply wrapped value;
   decrypting said triply wrapped value using a third decryption key associated with said third encryption key to obtain said doubly wrapped value;
   securely communicating said doubly wrapped value to said second node from the first node;
   obtaining a second decryption key having a predetermined expiration time at the second node;
   determining if said second decryption key has expired;
   decrypting said doubly wrapped value using said second decryption key to produce said singly wrapped value if it has been determined that said second decryption key has not expired; and
   securely communicating said singly wrapped value from the second node to the first node,
   wherein the first and third encryption keys are the same and the first and third decryption keys are the same and the first and third encryption and decryption keys are associated with the first node.

2. The method of claim 1 further including the step of decrypting said singly wrapped value to obtain said value using said first decryption key.

3. The method of claim 1 wherein said first encryption and decryption keys comprise a first public and private key pair.

4. The method of claim 1 wherein said second encryption and decryption keys comprise a second public and private key pair.

5. The method of claim 1 wherein said third encryption and decryption keys comprise a third public and private key pair.

6. The method of claim 1 further including the steps of:
   receiving at said first node an identifier associated with said second node; and
   forwarding said doubly wrapped value to said second node at an address associated with said identifier.

7. The method of claim 6 wherein said identifier comprises a uniform resource locator associated with said second node.

8. The method of claim 1 wherein said step of securely communicating said doubly wrapped value to said second node from the first node comprises the steps of:
   encrypting said doubly wrapped value with a fourth encryption key to form an encrypted doubly wrapped value, wherein said fourth encryption key has a corresponding fourth decryption key;
   encrypting said fourth decryption key with said second encryption key;
   communicating said encrypted fourth decryption key and said encrypted doubly wrapped value from said first node to said second node;
   decrypting said encrypted fourth decryption key to obtain said fourth decryption key using said second decryption key in the event said second decryption key has not expired; and
   decrypting said encrypted doubly wrapped value using said fourth decryption key to obtain said doubly wrapped value,
   wherein the fourth encryption and decryption keys are generated by the first node.

9. The method of claim 8 wherein said fourth encryption and decryption keys comprise symmetric keys.

10. The method of claim 8 further including the steps of encrypting said fourth encryption key with said second encryption key and communicating said encrypted fourth encryption key to said second node; and wherein said step of securely communicating said singly wrapped value to a third node comprises the steps of:

decrypting said encrypted fourth encryption key using said second decryption key to obtain said fourth encryption key, in the event said second decryption key has not expired;

encrypting said doubly wrapped value with said fourth encryption key to obtain a securely wrapped value;

communicating said securely wrapped value from said second node to said first node; and     decrypting said securely wrapped value using said fourth decryption key to obtain said doubly wrapped value.

11. The method of claim 10 wherein said fourth encryption and decryption keys comprise symmetric keys.

12. The method of claim 1 wherein said value comprises a first secret key and said method further includes the steps of:

at a third node, encrypting information with said first secret key to form an encrypted information value;

communicating said encrypted information value from the third node to said first node;

decrypting said singly wrapped value at said first node using said third decryption key to obtain said first secret key; and     decrypting said encrypted information value at said first node using said first secret key to obtain said information.

13. The method of claim 12 further including the step of deleting said first secret key at said first node subsequent to decrypting said encrypted information value.

14. The method of claim 1 further including the step of receiving at said second node a key identifier associated with said second decryption key and said obtaining step comprises the step of using said key identifier to select said second decryption key from a plurality of decryption keys accessible by said second node.

15. A method for performing secure ephemeral communication comprising:

receiving, at a first node, a doubly wrapped value, said value being encrypted with a first encryption key to form a singly wrapped value, said singly wrapped value being encrypted with a second encryption key to form said doubly wrapped value;

receiving, at said first node, an integrity verification key securely associated with said doubly wrapped value;

communicating a proof value from a second node to said first node;

obtaining at said first node a second decryption key associated with said second encryption key, said second decryption key having a predetermined expiration time;

determining if said second decryption key has expired;

decrypting said doubly wrapped value using said second decryption key to obtain said singly wrapped value if it has been determined that said second decryption key has not expired;

at the first node, determining that the second node is authorized to receive said singly wrapped value as a function of said proof value and said integrity verification key;

if it is determined that said second node is authorized to receive said singly wrapped value, securely communicating said singly wrapped value to said second node by encrypting the singly wrapped value with a third encryption key to form an encrypted singly wrapped value, wherein said third encryption key has a corresponding third decryption key accessible to said second node, and communicating said encrypted singly wrapped value from said first node to said second node; and     decrypting, at the second node, said encrypted singly wrapped value received from said first node using said third decryption key to obtain said singly wrapped value.

16. The method of claim 15 further including the step of decrypting said singly wrapped value to obtain said value using a first decryption key associated with said first encryption key and accessible to said second node.

17. The method of claim 16 wherein said first encryption and decryption keys comprise first public and private keys of a public-private key pair associated with said second node.

18. The method of claim 15 wherein said second encryption and decryption keys comprise second public and private keys of a second public-private key pair associated with said first node.

19. The method of claim 15 wherein said integrity verification key comprises said first public key associated with said second node and said securely associating step includes the step of encrypting said singly wrapped value and said first public key with said second encryption key, said step of communicating said proof value comprises the step of generating by said second node a digital signature using said second node private key, and said step of determining that said second node is authorized to receive the singularly wrapped value comprises the step of verifying said digital signature at said first node using said second node public key.

20. The method of claim 15 wherein said step of communicating said proof value that said second node is authorized comprises the step of securely communicating from said second node to the first node said proof value that said second node is an authorized decryption agent for said value.

21. The method of claim 15 wherein said third encryption and decryption keys comprise a first symmetric key pair.

22. The method of claim 16 wherein said value comprises a secret key and said method further includes the steps of:

receiving at said second node an encrypted information payload comprising an information payload encrypted with said secret key; and     decrypting said encrypted information payload at said second node using said secret key.

23. A system for performing secure ephemeral communication comprising:

first, second and third communicably coupled nodes, each of said nodes including a processor and a memory, the processor in each respective node being operative to execute program code contained within the respective memory;

program code within said first node memory for receiving a triply wrapped value, said value being encrypted with a first encryption key to form a singly wrapped value, said singly wrapped value being encrypted with a second encryption key to form a doubly wrapped value, and said doubly wrapped value being encrypted with a third encryption key to form said triply wrapped value;

program code within said first node memory for decrypting said triply wrapped value using a third decryption key associated with said third encryption key to obtain said doubly wrapped value;

program code within said first node memory for securely communicating said doubly wrapped value to said second node;

program code within said second node memory for
obtaining a second decryption key having a predetermined expiration time at said second node, wherein
said second decryption key is associated with said
second encryption key;
program code for determining if said second decryption
key has expired;
program code within said second node memory for
decrypting said doubly wrapped value using said second decryption key to obtain said singly wrapped value
if it has been determined that said second decryption
key has not expired; and
program code within said second node memory for
securely communicating said singly wrapped value to
the first node following decryption of said doubly
wrapped value,
wherein said first and third encryption keys are the same
and said first and third decryption keys are the same and
the first and third encryption and decryption keys are
associated with the first node.

24. The system of claim 23 further including program code within said first node memory for decrypting said singly wrapped value using the first decryption key associated with said first encryption key.

25. A system for performing secure ephemeral communication comprising:
first and second communicably coupled nodes, said nodes
including a processor and a memory, the processor in
each respective node being configured to execute program code contained within the respective memory;
program code within said first node memory for receiving
a doubly wrapped value, said value being encrypted
with a first encryption key to form a singly wrapped
value, said singly wrapped value being encrypted with
a second encryption key to form said doubly wrapped
value;
program code within said first node memory for receiving
an integrity verification key securely associated with
said doubly wrapped value;
program code within said second node for communicating
a proof value from said second node to said first node;
program code within said first node for obtaining a second
decryption key associated with said second encryption
key, said second decryption key having a predetermined expiration time;
program code within said first node for determining if said
second decryption key has expired;
program code within said first node memory for decrypting said doubly wrapped value using said second
decryption key to obtain said singly wrapped value if it
has been determined that said second decryption key
has not expired;
program code within said first node memory for determining that the second node is authorized to receive
said singly wrapped value as a function of said proof
value and said integrity verification key; and
program code within said first node memory for securely
communicating said singly wrapped value to said second node, in response to a determination that said
second node is authorized to receive said singly
wrapped value, by: encrypting the singly wrapped
value with a third encryption key to form an encrypted
singly wrapped value, wherein said third encryption
key has a corresponding third decryption key accessible
to said second node; and communicating said encrypted
singly wrapped value from said first node to said
second node; and program code within said second node memory for
decrypting said encrypted singly wrapped value
received from said first node using said third decryption
key to obtain said singly wrapped value.

26. The system of claim 25 further including program code within said second node memory for decrypting said singly wrapped value using a first decryption key associated with said first encryption key.

27. A system for performing secure ephemeral communication comprising:
first, second and third communicably coupled nodes, each
of said nodes including a processor and a memory, the
processor in each respective node being operative to
execute program code contained within the respective
memory;
means associated with said first node for receiving a triply
wrapped value, said value being encrypted with a first
encryption key, having an associated first decryption
key, to form a singly wrapped value, said singly
wrapped value being encrypted with a second encryption key to form a doubly wrapped value, and said
doubly wrapped value being encrypted with a third
encryption key to form said triply wrapped value;
means associated with said first node for decrypting said
triply wrapped value using a third decryption key
associated with said third encryption key to obtain said
doubly wrapped value;
means associated with said said first node for securely
communicating said doubly wrapped value to said
second node;
means associated with said second node for obtaining a
second decryption key having a predetermined expiration time, wherein said second decryption key is associated with said second encryption key;
means associated with said second node for determining
if said second decryption key has expired;
means associated with said second node for decrypting
said doubly wrapped value using said second decryption key to obtain said singly wrapped value if it has
been determined that said second decryption key has
not expired; and
means associated with said second node memory for
securely communicating said singly wrapped value to
the first node following decryption of said doubly
wrapped value;
wherein said first and third encryption keys are the same
and said first and third decryption keys are the same and
the first and third encryption and decryption keys are
associated with the first node.

28. The system of claim 27 further including means associated with said first node for decrypting said singly wrapped value using the first decryption key associated with said first encryption key.

29. A system for performing secure ephemeral communication comprising:
first and second communicably coupled nodes, said nodes
including a processor and a memory, the processor in
each respective node being operative to execute program code contained within the respective memory;
means, associated with said first node, for receiving a
doubly wrapped value, said value being encrypted with
a first encryption key to form a singly wrapped value,
said singly wrapped value being encrypted with a
second encryption key to form a doubly wrapped value;
means, associated with said first node, for receiving an
integrity verification key securely associated with said
doubly wrapped value;

means, associated with said second node, for communicating a proof value from said second node to said first node;

means, associated with said first node, for obtaining a second decryption key associated with said second encryption key, said second decryption key having a predetermined expiration time;

means for determining if said second decryption key has expired;

means, associated with said first node, for decrypting said doubly wrapped value using said second decryption key to obtain said singly wrapped value if it has been determined that said second decryption key has not expired;

means, associated with said first node, for determining that the second node is authorized to receive said singly wrapped value as a function of said proof value at first node and said integrity verification key;

means, associated with said first node, for securely communicating said singly wrapped value to said second node, in response to a determination that said second node is authorized to receive said singularly wrapped value, by: encrypting the singly wrapped value with a third encryption key to form an encrypted singly wrapped value, wherein said third encryption key has a corresponding third decryption key accessible to said second node; and communicating said encrypted singly wrapped value from said first node to said second node; and means, associated with said second node, for decrypting said encrypted singly wrapped value received from said first node using said third decryption key to obtain said singly wrapped value.

30. The system of claim 29, further comprising:

means, associated with said second node, for decrypting said singly wrapped value using a first decryption key associated with said first encryption key.

* * * * *

UNITED STATES PATENT AND TRADEMARK OFFICE
CERTIFICATE OF CORRECTION

PATENT NO. : 7,016,499 B2 Page 1 of 1
APPLICATION NO. : 09/880470
DATED : March 21, 2006
INVENTOR(S) : Radia J. Perlman It is certified that error appears in the above-identified patent and that said Letters Patent is hereby corrected as shown below:

Column 10,
Line 36, please add "," after "receiving" and "node"

Column 11,
Line 3, please change "third" to "first"
Line 18, please change "includes" to "comprises"

Column 12,
Line 9, please change "including" to "comprising"
Line 21, please change "said" to "a"
Line 22, please change "includes' to "comprises"

Signed and Sealed this

Twenty-second Day of August, 2006

JON W. DUDAS
*Director of the United States Patent and Trademark Office*